Dec. 30, 1952  C. W. HARRIS  2,623,420
FLOATING EXPANSION REAMER
Filed Feb. 20, 1948  3 Sheets-Sheet 1
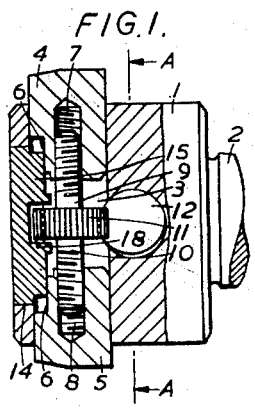
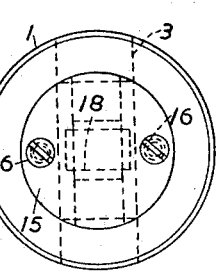
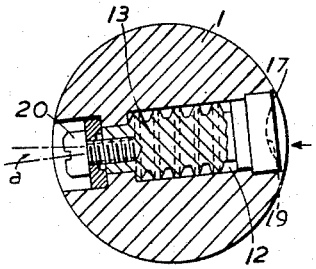
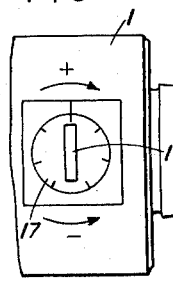
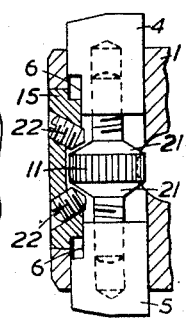
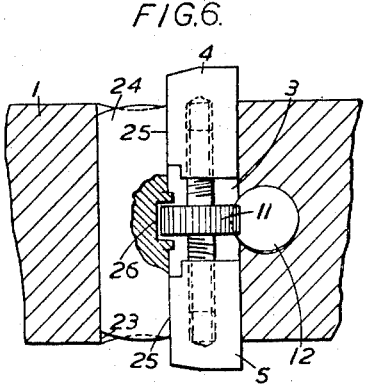
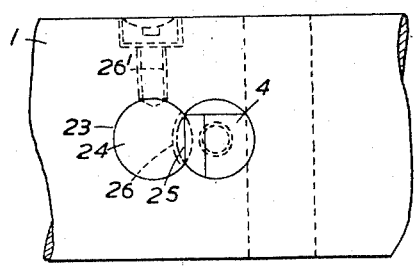
Claud William Harris
Inventor
By Cushman, Darby & Cushman
Attorneys Dec. 30, 1952 C. W. HARRIS 2,623,420
FLOATING EXPANSION REAMER
Filed Feb. 20, 1948 3 Sheets-Sheet 2

Claud William Harris
Inventor

By Cushman, Darby & Cushman
Attorneys

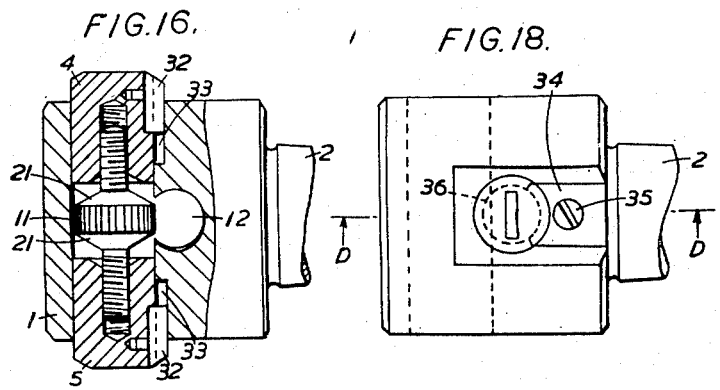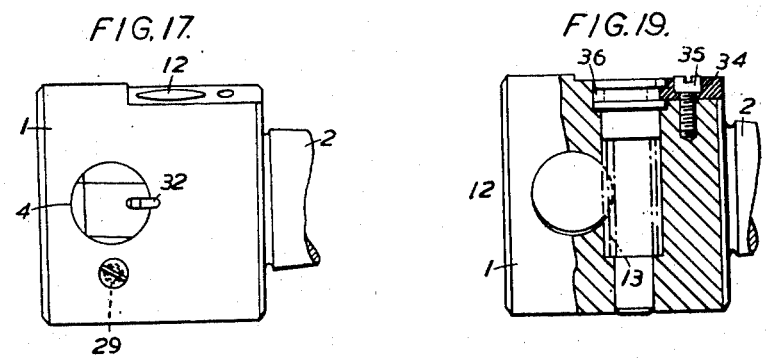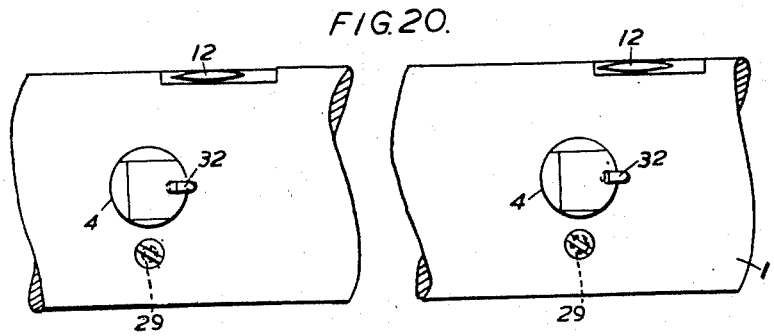

Patented Dec. 30, 1952

2,623,420

UNITED STATES PATENT OFFICE 2,623,420

FLOATING EXPANSION REAMER

Claud William Harris, Leeds, England

Application February 20, 1948, Serial No. 9,838
In Great Britain September 27, 1944

Section 1, Public Law 690, August 8, 1946
Patent expires September 27, 1964

4 Claims. (Cl. 77—58)

This invention relates to reamers of the floating expansion type, in which a pair of cutters are free to float in a direction at right angles to the axis of the reamer in order that they may adjust themselves to any inaccuracy in the alignment between the axis of the tool and the work.

In a known form of reamer of the type referred to, the float of the cutters is controlled by screws whose tapered ends engage with recesses in the cutters, and it is necessary, when adjusting the cutters for varying sizes of hole, to adjust also the screws which control the float, an operation requiring time and considerable care. Further, in this known form of reamer, the cutters are positively controlled in one direction only, that is, when expanding. This invention has for its object simplified construction, which involves no costly machine operations, sensitive adjustment of the cutters, provides for a float which is unaffected by adjustment of the cutters, together with positive control of the cutters in both directions, that is, when reducing or expanding. A special feature is the facility with which the invention may be applied to boring bars, such as are in common use in connection with horizontal and vertical boring machines.

In order that the invention may be readily understood it is described with reference to the accompanying drawings, in which:

Figure 1 is a part sectional elevation, with adjusting worm removed.

Figure 2 is an end view of Figure 1.

Figure 3 is a sectional view taken on the line A—A of Figure 1, with the adjusting worm in position.

Figure 4 is a side view taken in the direction of the arrow in Figure 3.

Figure 5 is a fragmentary sectional view, similar to Figure 1, showing an alternative arrangement for controlling the float.

Figure 6 is a sectional elevation showing the invention applied to a boring bar.

Figure 7 is a plan view of Figure 6.

Figure 16 is a part sectional elevation of a further alternative construction, the worm being removed.

Figure 17 is a plan view of Figure 16.

Figure 18 is a side view of the reamer looking upon the head of the adjusting worm, the cutters being removed.

Figure 19 is a part sectional view on the line D—D of Figure 18.

Figure 20 shows this further alternative construction applied to a boring bar.

Figure 8:
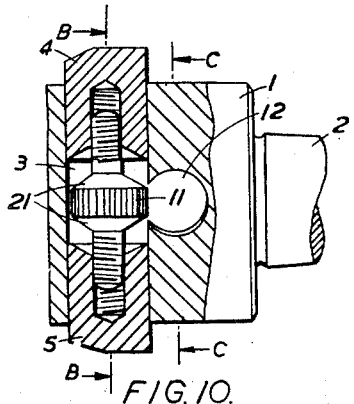
Figure 8 is a part sectional elevation, with adjusting worm removed, of an alternative construction.

Referring to Figures 1 to 4 of the drawings, the reamer consists of a body 1 and tapered shank 2. The body is bored transversely at 3 to receive the cutters 4 and 5 which are of circular section with flats 6 at their inner ends, and these cutters are similar in all respects, except that one is internally threaded right hand and the other left hand as shown at 7 and 8. These tapped holes mate with the threaded shanks 9 and 10, which are integral with the spur pinion 11, the outer diameter of which is the same as the diameter of the cutters. A second boring 12 in the body receives the adjusting worm 13, which may be either single or multi threaded, and this worm engages with the teeth of the pinion 11. The angular disposition of the axis of 12 with the axis of the cutters and pinion is dependent on the helix angle of the worm thread, and makes an angle $a$ (see Figure 3), with a diametral line at right angles to the axis of the spur pinion, equal to the helix angle of the worm thread.

This disposition is usual with worms mating with spur gears, and ensures that the floating action of the cutters and spur pinion has no turning effect on the pinion, and hence no effect on the diameter of the reamed hole.

The body is recessed at 14 to receive the disc insert 15, secured to the body by screws 16, and this insert has the dual purpose of preventing the cutters turning in their housing by engaging the flats 17 on their inner ends, whilst a slot or channel 18, integral with the insert 15, which is slightly wider than the face of the pinion, partially encloses the sides of the pinion, permitting the pinion to rotate and limiting the float of both pinion and cutters. It will be clear that the pinion 11 is free to rotate but the cutters are free only to slide at right angles to the axis of the reamer. The adjusting worm 13 has a micrometer dial 17 at its end, and a slot 19 permits of the worm being turned as by a special key provided for the purpose.

The screw 20 (Figure 3) locks the worm securely after adjustment. It will be understood that the float is entirely unaffected by adjustment of the cutters for size of hole, and that both cutters are positively controlled in both directions of movement by the threaded shanks 9 and 10.

An alternative construction which provides control of the float is shown in Fig. 5, and enables a variable float to be obtained if desired. In this arrangement the pinion has conical sides 21, and two screws 22 are angularly disposed in the face of the disc insert 15. The tapered ends of the screws 22 limit the float by contact with the conical sides 21 of the pinion 11, and by adjusting the screws forward or backward the float may be varied as desired.

Figures 6 and 7 show the invention applied to a boring bar. The disposition of the cutters and adjusting worm are the same as for the reamer, but to prevent the turning of the cutters in their housing 3 and permit the necessary float, a further hole 23 is bored in the body 1 of the bar, parallel to the housing 3 and adjacent to it, and this further hole is fitted with a pin 24 having flats 25 at its outer ends which engage corresponding flats on the cutters to prevent them turning in the housing 3. At the centre of the pin 24 is machined a slot or channel 26, wide enough to permit of a limited float to the cutters 4 and 5, which float is entirely unaffected by adjustment of the cutters for size of hole. The pin 24 is secured by the screw 26', and in assembling, the pin 24, cutters 4 and 5 and pinion 11 are inserted together as a sub-assembly, in their respective holes, and the worm finally placed in position.

Figure 9:
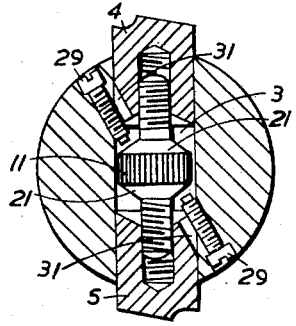
Figure 9 is a sectional view on the line B—B of Figure 8.
Figure 10:
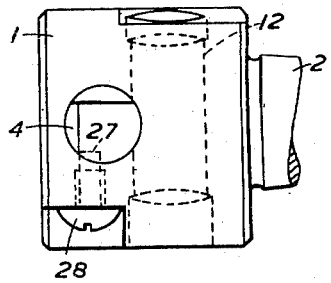
Figure 10 is a plan view of Figure 8.
Figure 11:
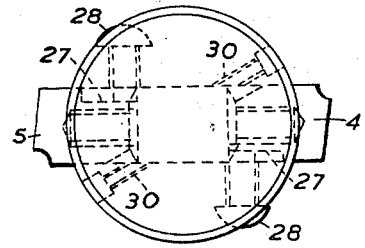
Figure 11 is an end view of Figure 10.
Figure 12:
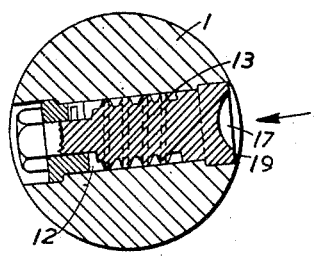
Figure 12 is a sectional view on the line C—C of Figure 8, with the worm in position.
Figure 13:
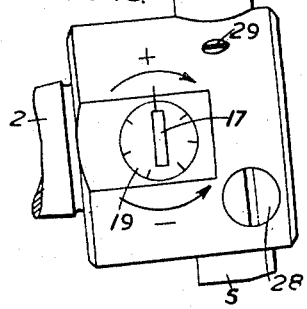
Figure 13 is a side view of the reamer looking in the direction of the arrow in Figure 12.
Figure 14:
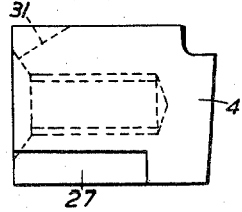
Figures 14 and 15 are, respectively, a side view and an end view of a cutter.
Figure 15:
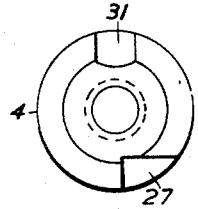

Figures 8 to 15 show an alternative construction of reamer which is simpler and cheaper to construct, the provision of the insert disc 15 being eliminated.

In the reamer body 1 the usual holes 3, to house the cutters 4 and 5, and 12 to house the adjusting worm 13, are bored exactly as in the previous construction.

The cutters 4 and 5 have angular grooves 27 machined in them (see particularly Figures 14 and 15), and the plain ends of the screws 28 engage these grooves. The twisting motion of the cut is resisted by the flat ends of the screws 28 engaging the major side of the grooves 27, whilst turning motion in the opposite direction is resisted by the periphery of the plain ends of the screws engaging the lesser sides of the grooves, and thus the cutters are prevented from rotating in their housing 3.

The pinion 11 has conical sides 21, and screws 29 (see particularly Figure 9) are disposed in corresponding holes 30 in the body 1 so that the ends of the screws 29 are normal to the conical sides 21 of the pinion 11. The screws 29 may be adjusted to permit the cutters to float in their housing 3 to any workable extent, and also prevent the cutters from being detached from the body.

Interference by the cutters with the screws 29 is prevented by machining grooves 31 in the cutters.

An alternative method of resisting the turning action of the cut is shown in Figures 16 and 17. The screws 28 are replaced by peg keys 32 fitted at the rear of the two cutters 4 and 5, these peg keys having a sliding fit in keyways 33 in the body 1. Figure 20 shows the application of this construction to a boring bar, and the number of cutters and spacing thereof can be arranged for any special requirements.

Figures 18 and 19 show an alternative method of retaining the adjusting worm 13 in its housing 12 in the body of a reamer or boring bar, by means of a locking plate 34 which is secured to the body by a screw 35 and engages an annular groove or recess in the head of the adjusting worm 13. The plate will be of spring steel, and it will be seen that plate 34 engaging the annular groove 36, the worm 13 may be rotated but cannot move axially.

I claim:

1. A floating expansion reamer comprising a solid one piece head having a transverse through opening, a pair of axially disposed spaced cutters slidably mounted in said opening and provided with opposed axially aligned internally right and left hand threaded bores, a pinion mounted in said opening between the cutters and having right and left hand threaded extensions on opposite sides thereof engaging the threads in said bores, a second opening disposed transversely to said opening and overlapping the same, a rotatable worm mounted in the second opening and meshing with said pinion, means for providing a floating action of the cutters and said pinion in said transverse opening, and means for limiting the amount of the floating action including abutments engaging opposite sides of said pinion.

2. A floating expansion reamer comprising a solid one piece head having a transverse through opening, a pair of axially disposed spaced cutters slidably mounted in said opening and provided with opposed axially aligned internally right and left hand threaded bores, a pinion mounted in said opening between the cutters and having right and left hand threaded extensions on opposite sides thereof engaging the threads in said bores, one of said extensions having right handed threads and the other left handed threads, a second opening disposed transversely to said opening and overlapping the same, a rotatable worm mounted in the second opening and meshing with said pinion, means for providing a floating action of the cutters and said pinion in said transverse opening, the outer diameter of the pinion not being greater than the diameter of the cutter, and means for limiting the amount of the floating action, said means comprising screws engaging opposite sides of said pinion.

3. A floating expansion reamer as called for in claim 1 in which the cutters have angular grooves and in which screws connected to the head are arranged to engage the grooves for resisting twisting and turning motion of the cutters.

4. A floating expansion reamer as called for in claim 1 provided with means for resisting the turning action of the cutter including keys insertable in said transverse opening between the cutter and the wall of the opening.

C. W. HARRIS.

REFERENCES CITED

The following references are of record in the file of this patent:

UNITED STATES PATENTS

| Number | Name | Date |
| --- | --- | --- |
| 1,232,411 | Van der Vorn | July 3, 1917 |
| 1,324,459 | Maier | Dec. 9, 1919 |
| 1,389,492 | Darie | Aug. 30, 1921 |
| 1,635,103 | Welshy | July 5, 1927 |
| 2,338,073 | Behr | Dec. 28, 1943 |
| 2,364,259 | Welshy et al. | Dec. 5, 1944 |

FOREIGN PATENTS

| Number | Country | Date |
| --- | --- | --- |
| 176,095 | Switzerland | Mar. 31, 1935 |